United States Patent [19]

Butenuth

[11] Patent Number: 4,730,333
[45] Date of Patent: Mar. 8, 1988

[54] GAS LASER WITH HIGH-FREQUENCY EXCITATION

[75] Inventor: Dieter Butenuth, Dettingen, Fed. Rep. of Germany

[73] Assignee: Elcede GmbH, Kirchheim, Fed. Rep. of Germany

[21] Appl. No.: 39,211

[22] Filed: Apr. 17, 1987

[30] Foreign Application Priority Data

Apr. 29, 1986 [DE] Fed. Rep. of Germany ....... 3614471

[51] Int. Cl.⁴ .............................................. H01S 3/097
[52] U.S. Cl. ........................................ 372/87; 372/82; 372/55; 372/35; 372/38
[58] Field of Search ....................... 372/35, 81, 82, 83, 372/87, 88, 55

[56] References Cited

U.S. PATENT DOCUMENTS

| | | | |
|---|---|---|---|
| 3,828,277 | 8/1974 | Otto et al. | 372/82 |
| 4,509,174 | 4/1985 | Lacour et al. | 372/82 |
| 4,618,961 | 10/1986 | Sutter, Jr. | 372/82 |

FOREIGN PATENT DOCUMENTS

| | | |
|---|---|---|
| 172046 | 6/1985 | European Pat. Off. . |
| 1514713 | 11/1975 | Fed. Rep. of Germany . |
| 2485050 | 2/1982 | France .................................. 372/82 |
| 1234094 | 6/1971 | United Kingdom . |

OTHER PUBLICATIONS

"Electronics Letters", vol. 5., No. 4, Feb. 20, 1969, pp. 63-64.

Primary Examiner—Leon Scott, Jr.
Attorney, Agent, or Firm—Hopgood, Calimafde, Kalil, Blaustein & Judlowe

[57] ABSTRACT

The laser tube (14) of a gas laser is arranged in an electrically grounded metallic housing (11) which forms the one electrode of a capacitor. The second electrode (41) of the capacitor is arranged, together with a helically wound wire (53) for the formation of an inductance, in the annular space between the laser tube and the housing. The capacitance and the inductance form an LC-circuit for adapting the impedance of the laser to that of a high-frequency generator. To adjust capacitance, the distance between the two capacitor electrodes (11 and 41) can be adjusted via a first setting device (43 to 45) and the length of the coil formed by the helical wire (53) can be adjusted to set the inductance via a second setting device (56 to 58).

22 Claims, 3 Drawing Figures

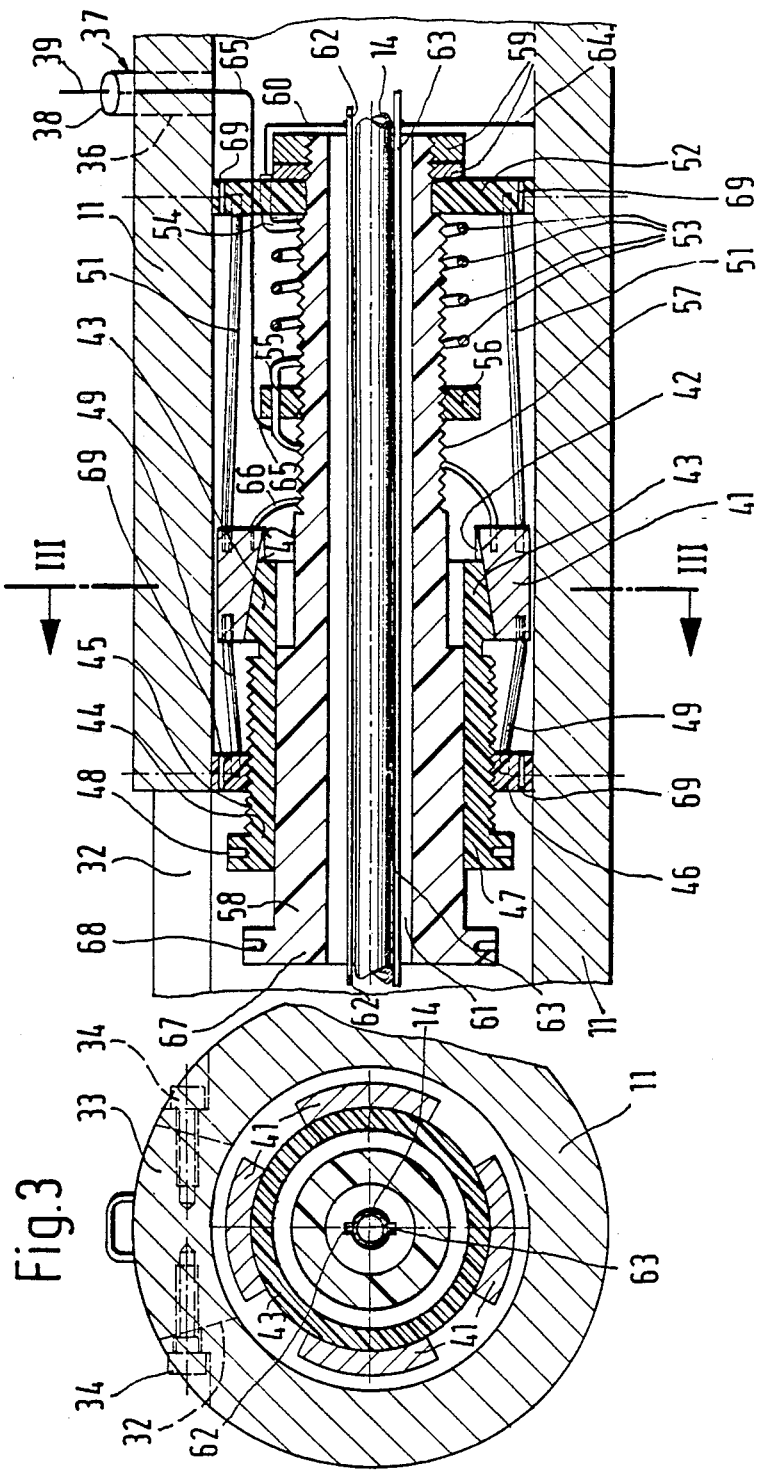

GAS LASER WITH HIGH-FREQUENCY EXCITATION

BACKGROUND OF THE INVENTION

The present invention relates to a gas laser with high-frequency excitation, wherein the laser comprises a tube which is disposed in an electrically grounded metal housing, and wherein the laser has two electrodes for excitation by a high-frequency generator, and wherein the electrodes extend along the laser tube in diametrically opposite relation, one of the electrodes being electrically grounded while the other electrode is connected to a high-frequency feed line which contains a filter circuit with adjustable inductance and capacitance to adapt the impedance of the laser to that of the high-frequency generator.

In the following text, the customary abbreviations "HF" and "LC circuit" are used, respectively, for "high-frequency" and for "filter circuit".

A continuous HF-excited waveguide $CO_2$ laser wtih high-frequency tunability and high output power has been described in the dissertation by G. Merkle of the Institute for Plasma Research of the University of Stuttgart, January 1983. According thereto, the LC circuit serves to make the imaginary (reactance) component of the laser impedance as nearly as possible equal to zero and to match the real component (resistance) to the internal resistance of the HF generator.

BRIEF STATEMENT OF THE INVENTION

The object of the invention is to provide the best possible construction for a gas laser of the indicated type.

In the case of the aforementioned gas laser, the invention achieves this object by using the laser housing as an electrically grounded first electrode of the capacitor, by disposing the second electrode of the capacitor within the housing, and by providing for selectively adjusting the capacitance via means whereby the second electrode can be set at adjustable offset from the wall of the housing. As a result, the adjustable capacitor is within the laser housing, in a very compact manner. This is particularly advantageous when a coolant line surrounds the laser tube over its entire length, and the outer wall of the coolant line is formed by the outer wall of the laser housing. In this way, the laser housing serves both as a component of the cooling means and as a component of the capacitor of the LC-circuit.

Moreover, the laser housing can at the same time be used as electromagnetic shielding of the laser tube and thus also provide electromagnetic shielding of the capacitor of the LC-circuit.

In one advantageous embodiment of the invention, the second capacitor electrode is positioned by at least one elastically flexible rod which is fixed to the laser housing and extends generally longitudinally within the laser tube; an adjustment device for variably setting the capacitance has an adjustment member of insulating material which has a cam surface (inclined with respect to the axis of the laser tube), in radially deflecting contact with the second capacitor electrode; and the adjustment member is longitudinally displaceable within the laser housing for selective adjustment of radial offset of the second capacitor electrode from the housing wall, thereby enabling adjustment of the capacitance of the LC-circuit, by axial displacement of the adjustment member.

It is particularly advantageous for the capacitance-adjustment member to be developed at one end of a threaded spindle which extends substantially parallel to the laser tube, and for this spindle to be in threaded engagement with a threaded ring that is fixed to and within the laser housing. A very space-saving, compact construction of the gas laser is obtained by developing this spindle as an externally threaded sleeve which surrounds and is radially spaced from the laser tube, the spindle having a frusto-conical cam portion, for radial displacement of one or more capacitor elements, the latter being radially deflectable against radially inward compliant loading by angularly spaced elastically flexible rods. Outer surfaces of these capacitor elements face and are radially offset from the inner wall of the laser housing, and the cammed reaction ot the frusto-conical portion always positions all of the movable capacitor elements in concentric array with respect to the inner wall of the housing.

In a manner analogous to the indicated adjustable capacitor, the adjustable inductance can also be arranged, alone or together with the capacitor, within the laser housing. This can be achieved by developing the adjustable inductance as a helically wound coil of wire within the laser housing, and by providing for adjustment of the inductance via means whereby the coil can be adjusted to different lengths, by stretching or compressing the same.

In this connection, and for adjustment of inductance, it is advantageous (a) to secure one end of the wound coil wire to an insulating member that is fixed to the laser housing and (b) to secure its other end to an axially displaceable nut, in threaded engagement with a rotatable spindle which is mounted and axially retained.

Further analogous to the arrangement of the variable capacitor within the laser housing, it is advantageous to develop the inductance-adjusting spindle as an externally threaded sleeve, that this sleeve, the coil and an insulating disk mount for the sleeve and for the fixed end of the coil (the disk being fastened to the housing) shall surround the laser tube, in radially spaced relation, and that the sleeve be axially retained by and rotatably journaled in the disk.

It is particularly advantageous to combine the two solutions of the invention and to provide (a) that, for the formation of a capacitor of the filter circuit, the laser housing is the electrically grounded first electrode of the capacitor, (b) that the second electrode of the capacitor is movably arranged within the housing, with a capacitance-adjustment device by means of which different spacings can be set for offset of the second electrode from the wall of the housing, and (c) that the adjustable inductance of the filter circuit be a coil of helically wound wire which is arranged within the laser housing, with an inductance-adjustment device for setting the inductance by adjusting the coil to different lengths, through stretch or compression of the same. This arrangement makes it possible to provide the entire LC-filter, including the means for selective adjustment of both the capacitance and inductance components thereof, within the coolant line which surrounds the laser tube.

DETAILED DESCRIPTION

A preferred embodiment of the invention will be described in detail for a gas-laser embodiment, in conjunction with the accompanying drawings, in which:

FIG. 2 is an enlarged fragmentary view in longitudinal section along the axis of the structure of FIG. 1; and FIG. 3 is a transverse section, along the line III—III of FIG. 2.

Figure 1:
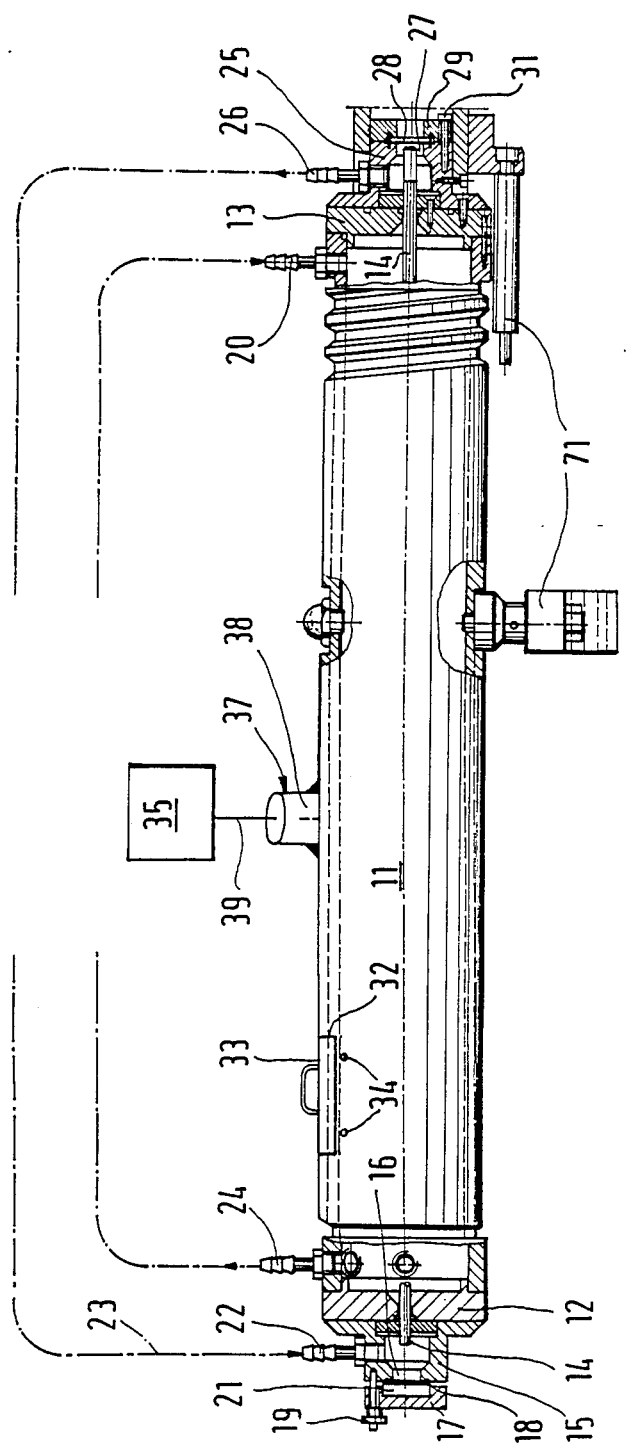
FIG. 1 is a side view in elevation, partly broken-away and in longitudinal section.

The gas laser shown in the drawings comprises a circularly cylindrical steel-pipe housing 11 which is closed at its two ends by aluminum end plates 12 and 13 which have central holes to receive a waveguide, of quartz glass, which forms the actual laser tube 14. The laser tube 14 is displaceably mounted in the plates 12 and 13 via gas-tight lead-throughs which are developed as O-rings (not shown in the drawing), so that differential thermal expansion of the laser housing 11 and of the laser tube 14 is possible without producing damage.

The end of the laser tube 14 which extends out of the end plate 12 extends into a socket 15 having gas-tight connection to the end plate 12. And a cover 17 provides gas-tight closure of the outer opening 16 of socket 15, via an interposed sealing ring 18 and by means of clamp screws 19, only one of which is shown in FIG. 1. The cover 17 serves at the same time as the mount for an end mirror 21. A radial opening in the socket 15 is provided with a connection fitment 22 for a laser-gas feed line 33. Also adjacent the end plate 12, a connection fitment 24 to the end of housing 11 is provided for exhaust flow of coolant liquid which is supplied to the laser housing 11 at the other end, through a connection fitment 20.

In the same way as described for end plate 12, the end plate 13 also has gas-tight connection to a socket 25 which has a connection fitment 26 for the discharge end of the laser-gas line, and the opening 27 of socket 25 is closed by a mirror 28. This mirror 28 is retained by socket 25 via sealing rings (merely indicated in FIG. 1), provided on both sides of the mirror in gas-tight manner, and by a cover ring 29 which is clamped to socket 25 by screws 31, only one of which is shown in FIG. 1. The mirror 28 is partially transmittive, so as to permit external passage of a utile fraction of the laser radiation.

On its upper side, the laser housing 11 has a top opening 32 which can be closed by a cover 33, in liquid-tight manner. And FIG. 3 diagrammatically indicates removable connection of cover 33 to the laser housing 11, via screws 34.

Even when the laser housing 11 is filled with coolant, the top opening 32 provides actuating access to structural parts of adjustable inductance and capacitance components within housing 11, for matching the impedance of the laser to the impedance of a HF generator 35 which is merely schematically indicated in FIG. 1.

An HF lead-through 36 is provided in the wall of the laser housing 11, being diagrammatically indicated in FIG. 2; lead-through 36 accommodates a coaxial cable 37 (also only diagrammatically indicated in FIGS. 1 and 2) through which the HF voltage output of generator 35 is fed to the laser.

The tubular outer conductor 38 of the coaxial cable 37, will be understood to have electrical ground connection to the HF generator 35 and to have conductive connection to the laser housing 11, which is thus also electrically grounded. The inner conductor 39 of the HF voltage supply is connected to structural parts (within the laser housing) for adjusting inductance and capacitance of the LC-circuit of the laser.

One structural part of the adjustable capacitance of the LC-circuit is provided by the laser housing 11, being the electrically grounded first electrode of a capacitor. The second electrode of the capacitor consists of four spaced sectors 41 of a cylindrical aluminum ring, the inner surfaces 42 of which are segmental parts of a frusto-conical surface which rides the frusto-conical outer surface of an adjustment member or cam 43 of insulating material; member 43 is the developed end of a sleeve 44 which is coaxial to the laser tube 14. The sleeve 44 is a threaded spindle, having an outer thread 45 engaged to the inner thread of a ring 46 which is secured to laser housing 11.

At its other end, and in the region of access opening 33, sleeve 44 is provided with a setting head 47 which has blind radial holes for inserted-pin reception, when making rotary adjustment of sleeve 44 to thereby effect an incremental axial displacement of the adjustment member 43. The aluminum sectors 41 are radially displaceably retained by elastically flexible rods (49 and 51) of insulating material. The insulating rods 49 are mounted to ring 46, and the insulating rods 51 are mounted to a ring-shaped disk 52 the outer circumference of which is secured to the inner wall of laser housing 11, in the same way as in the case of ring 46.

A wire coil 53 is a structural part of the adjustable inductance of the LC-circuit. Coil 53 is helically wound around and spaced from the laser tube 14, with a fixed end 54 of the coil wire passing through disk 52 and being thus secured thereto. The other end 55 of the coil wire 53 passes through and is thereby secured to a nut 56 of insulating material. Nut 56 has threaded engagement with the outer thread 57 of an insulating sleeve 58 which is in coaxially guided relation to the laser tube 14 via the bore of sleeve 44. The turns of the wire coil 53 are of sufficient diameter to assure their local radial clearance with sleeve 58. A reduced cylindrical bearing portion at the end of the thread 57 of sleeve 58 engages a bearing bore in disk 52; this reduced bearing portion also defines a shoulder for axial reference to disk 52, and lock nuts 59 engaged to the further reduced and threaded extreme end of sleeve 58 engage the sides of disk 52 to complete the rotatable and axially retained mounting of sleeve 58. The annular space 61 between the bore of sleeve 58 and laser tube 14 will be understood to be sufficient for requisite coolant flow. The wire of coil 53 is suitably of silver-plated copper and has a diameter of 2 mm; it is thus so stiff that upon rotation of sleeve 58, coil 53 not only prevents nut 52 from rotating but also permits axial displacement of said nut.

Two electrodes 62 and 63 are mounted on the laser tube 14; these electrodes are formed of wires which are diametrically opposite each other and extend substantially over the entire length of that part of the laser tube 14 which is within the hollow interior of the laser housing 11. In the embodiment shown, the wires of electrodes 62 and 63 are straight and parallel to the axis of the laser tube. However, they can be wound, in diametrically opposite relation, with large pitch around the laser tube. The electrode 62 is connected by means of a line 60 to the coil-wire end 54 which passes through the disk 52. The electrode 63 is connected via a line 64 to the laser housing 11 and is thus electrically grounded. The inner conductor 39 of the coaxial cable 37 is connected via a line 65 to the coil-wire end 55 which passes through the nut 58, which end is connected in a semicircular arc to the diametrically opposite cylinder sector 41. All four cylinder sectors are radially positioned by the adjustment member 43 against the spring force of the rods 49 and 51; the sectors 41 are also spaced from each other by rods 49 and 51 and are connected electrically to each other by U-shaped flexible wires 66 (FIG. 2), to thereby define a second capacitor electrode.

As in the case of sleeve 44, the sleeve 58 is provided at its other end, i.e., within the region of opening 32, with an adjustment head 67 having radial holes 68, corresponding to the radial holes 48.

In order that coolant can flow through that part of housing (11) interior which contains the cylinder sectors 41 and the wound wire 53, axial passages 69, merely indicated in FIG. 2, are provided in ring 46 and in disk 52.

For a mounting of the described laser, holding members 71 shown in FIG. 1 are provided on the laser housing 11.

To match the impedance of the described laser to that of the high-frequency generator 35, the laser housing 11 is filled, with the top cover 33 removed, with coolant via the feed line through the connecting socket 25. High-frequency voltage is then fed to the laser through the coaxial cable 37, and rotary adjustment of the sleeves 44 and 58 effects corresponding adjustment of (a) the capacitor formed by the cylinder sectors 41 in combination with the laser housing 11 and (b) the wire coil of the LC-circuit.

In the embodiment shown, the laser housing 11 is developed as a cylindrical tube. However, it can also have any other shape, as for example, a prismatic shape. The members forming the second capacitor electrode must then have corresponding outer surfaces parallel to the inner walls of the laser housing 11. If the electrodes 62 and 63 are helically wound around the laser tube 14, they are held fast on the laser tube by lines 60 and 64 so that no other attachment means is necessary. And if electrodes 62 and 63 are straight (as shown), they can be firmly attached to the laser tube by cotton threads.

All features mentioned in the above specification as well as all those which can be noted merely from the drawing constitute parts of the invention as further embodiments of it, even though they have not been particularly emphasized and, in particular, have not been specifically mentioned in the claims.

What is claimed is:

1. A gas laser comprising an elongate laser tube with first and second electrode means for high-frequency excitation thereof, an elongate conductive tubular housing with an inner wall and a longitudinal axis and end closures supporting the ends of said laser tube in radially spaced relation to said inner wall within said tubular housing, gas-flow supply means for supplying gas to said laser tube, said gas supply means including an inlet connection at one end and an outlet connection at the other end of said laser tube, a grounding connection for a first one of said electrode means to said housing, and means including a high-frequency lead-through connection via said housing for excitation of said second electrode means, said lead-through connection comprising a movable capacitor-electrode element and an electrically insulating means for radially supporting and adjusting said movable capacitor-electrode element within said housing for offset with respect to said inner wall of said housing, whereby the housing comprises another capacitor element.

2. The gas laser of claim 1, in which said supporting and adjusting means is entirely supported by said housing and is in radially spaced relation to the laser tube.

3. The gas laser of claim 1, in which said movable capacitor element is one of an angularly spaced plurality of movable capacitor elements arrayed in radially spaced relation to and within said housing.

4. The gas laser of claim 1, in which said tubular housing is circularly cylindrical and said end closures support the ends of said laser tube in concentric relation within said tubular housing.

5. The gas laser of claim 1, in which said end closures comprise means for supplying coolant flow to the annular space between said laser tube and said tubular housing.

6. The gas laser of claim 1, in which said lead-through connection comprises a coaxial-line connection wherein a central conductor is surrounded by a cylindrical sheath conductor, the sheath conductor having ground connection to said housing.

7. A gas laser according to claim 1, in which said supporting and adjusting means has a supporting and adjusting surface inclined towards said axis of said tubular housing, and in which at least one elastically flexible elongate bearing means is provided which extends generally along said axis of said housing and has two ends, one of said ends being fixed to said tubular housing and the other of said ends bearing said capacitor-electrode element so that it contacts said supporting and adjusting surface, said supporting and adjusting means being displaceable generally parallel to said axis of said housing for adjusting said offset of said capacitor-electrode element with respect to said inner wall of said housing.

8. A gas laser according to claim 7, wherein said supporting and adjusting surface is frusto-conical and said movable capacitor-electrode element has frusto-conical surface in slidable contact with said supporting and adjusting surface.

9. A gas laser according to claim 1, in which said movable capacitor-electrode element has at least one surface extending at least along a part of said inner wall of said housing.

10. A gas laser according to claim 8, in which said movable capacitor element is one of an angularly spaced plurality movable capacitor elements, in the elements of said plurality being electrically connected to effectively form one movable capacitor element.

11. A gas laser according to claim 1, in which said supporting and adjusting means is a threaded spindle which extends generally parallel to said axis of said housing, the outer thread of said spindle meshing with a threaded ring part of said housing.

12. A gas laser according to claim 11, in which said threaded spindle is a sleeve with an external thread for said threaded ring part, said sleeve surrounding said laser tube and being radially spaced therefrom said movable capacitor-electrode element being one of a plurality movable capacitor elements in angularly spaced relation about said axis, each of said movable electrode elements having a frusto-conical inner surface and resilient means urging said plural electrode elements into engagement with said supporting and adjusting means.

13. A gas laser according to claim 12, in which said sleeve is provided with a setting head and a closable opening is provided in said housing for the actuating of said setting head.

14. The gas laser of claim 1, in which said lead-through connection further comprises a variable-inductance element in the form of a helical-wire coil and electrically insulating means for radially supporting said helical-wire coil within said housing, said coil being in radially spaced relation to both said housing and said laser tube, and electrically insulating means within said housing for varying inductance by selective adjustment of the elongation of the helical coil.

15. A gas laser according to claim 14, in which said helical-wire coil has two ends, one of said ends being fastened to an insulating member held by said housing and the other of said end being connected to a threaded nut which is axially displaceable but non-rotatable within said housing and means including an externally threaded sleeve within said housing and engaged to said nut for adjustably positioning said nut to thereby adjust the inductance of said coil, said sleeve, said helical-wire coil, and said insulating member surrounds said laser tube at a radial distance therefrom, said sleeve being held in turnable but axially non-displaceable manner by said insulating member.

16. A gas laser according to claim 15, in which said sleeve for adjustment of said helical coil is turnably mounted in a sleeve forming said supporting and adjustment means for said movable capacitor-electrode element.

17. A gas laser according to claim 1, in which said housing includes means for mounting the same with its axis horizontal, said housing having an upwardly facing opening providing local access to a part of said supporting and adjusting means, and a cover removably securable to said housing for selective closure of said opening.

18. A gas laser comprising an elongate laser tube with first and second electrode means for high-frequency excitation thereof, an elongate conductive tubular housing with an inner wall and a longitudinal axis and closures supporting the ends of said laser tube in radially spaced relation to said inner wall within said tubular housing, gas-flow supply means for supplying gas to said laser tube, said gas supply means including an inlet connection at one end and an outlet connection at the other end of said laser tube, a grounding connection for a first one of said electrode means to said housing, and means including a high-frequency lead-through connection via said housing for excitation of the other of said electrode means, in which said lead-through connection comprises a variable-inductance helical-wire coil and an electrically insulating means for radially supporting said helical-wire coil within said housing and in radially spaced relation to both said housing and said laser tube, and electrically insulating adjustment means within said housing for varying inductance by selective adjustment of elongation of the helical coil.

19. A gas laser according to claim 18, in which said helical-wire coil has two ends, one of ends being fastened to an insulating member held by said housing and the other of said end being connected to a threaded nut which is axially displaceable but non-rotatable within said housing and means including an externally threaded spindle within said housing and engaged to said nut for adjustably positioning said nut to thereby adjust the inductance of said coil.

20. A gas laser according to claim 19, in which said threaded spindle is a sleeve with outer threads for said screw nut, said sleeve, said helical-wire coil, and said insulating member surround said laser tube at a radial distance therefrom, said sleeve being held in turnable but axially non-displaceable manner by said insulating member.

21. A gas laser according to claim 20, in which said sleeve is provided with a setting head and a closable opening is provided in said housing for the actuating of said setting head.

22. A gas laser according to claim 18, in which said housing includes means for mounting the same with its axis horizontal, said housing having an upwardly facing opening providing local access to said adjustment means, and a cover removably securable to said housing for selective closure of said opening.

* * * * *